Patented Aug. 6, 1940

2,210,148

UNITED STATES PATENT OFFICE 2,210,148

CATALYTIC POLYMERIZATION OF OLEFINS

Heinz Indest, Ludwigshafen-on-the-Rhine, Germany, assignor, by mesne assignments, to William Currie, New York, N. Y.

No Drawing. Application December 3, 1938, Serial No. 243,774. In Germany December 6, 1937

3 Claims. (Cl. 196—10)

The present invention relates to the polymerization of low-molecular, in particular gaseous, olefins into low boiling liquid hydrocarbons, especially those boiling within the boiling point ranges of benzines.

It has already been proposed to carry out the said polymerization of low-molecular olefins into liquid hydrocarbons in the presence of oxygen-acids, in particular those of phosphorus. The said acids may be used in the liquid form or on solid carriers. It has also been proposed to use phosphoric acid together with various metal salts.

I have now found that in the said reaction the yields of polymeric hydrocarbons can be considerably increased by using as catalysts acids of phosphorus, in particular phosphoric acid (but also pyrophosphoric acid, metaphosphoric acid or phosphorus pentoxide may be employed), together with a finely divided metal which is less electro-positive than hydrogen. Finely divided copper is very suitable. Other metals which may be satisfactorily added are for example silver, cobalt or the platinum metals. The metal may be suspended in the liquid acid as such or precipitated on a carrier; it may also be applied to a carrier, such as kieselguhr or active carbon, together with the acid.

When the finely divided metal is used on a carrier, it is preferable to prepare it in an adherent form on the carrier itself. For this purpose the carrier, if desired after evacuation, may for example be impregnated with a solution of a salt (such as a nitrate or chloride) of the metal to be applied which is decomposed by heating to an oxide, the resulting oxide then being reduced. The preparation of the finely divided metal may also be carried out in one working operation with the activation of the carrier, for example when active carbon is employed as a carrier and the activation is effected by heating in the presence of hydrogen this heating may be carried out after impregnating the carbon with a salt of the metal which is to be applied to the carrier. The acid is then advantageously added to the carrier containing the metal while carefully excluding air.

The yields of polymeric hydrocarbons obtained with the said catalysts are higher by from about 15 to 20 per cent than those obtained under otherwise identical conditions but with catalysts containing as additions not a metal but a salt of the metal concerned. The working life of the catalyst is also prolonged as compared with catalysts containing as additions only the salts but not the free metals. The polymeric product obtained boils for the most part (usually to the extent of up to about 80 per cent) below 200° C.

As initial olefins there may be mentioned in particular the gaseous olefins, such as propylene and butylenes, or also ethylene; low-boiling liquid olefins, such as hexylenes or heptylenes, may, however, also be polymerized with good results. The said olefins may also be used in the form of mixtures with each other or with other gases, such as saturated gaseous methane hydrocarbons.

The conditions of polymerization are those usually employed in the catalytic polymerization in the presence of phosphoric acid catalysts. As a rule temperatures between 125° and 350° C., preferably between 150° and 250° C., are employed. The pressure is ordinarily atmospheric but also superatmospheric pressures may be used.

The following examples will further illustrate how the said invention may be carried out in practice, but the invention is not restricted to these examples.

Example 1

A solution of 7.9 grams of copper sulphate in 35 cubic centimeters of water is added while stirring to 100 cubic centimeters of active carbon. The mixture then has an ammoniacal solution of 15 grams of sodium hyposulphite in 100 cubic centimetres of water poured thereover; the reduction is carried out first in the cold and then on a steam bath. The carbon is then washed out thoroughly and 29 grams of 89 per cent phosphoric acid are stirred in while excluding air. 3 liters of propylene are led per hour at 200° C. over the catalyst thus prepared. The daily yield of polymeric hydrocarbons is 114 grams, or 1140 grams with reference to a liter of catalyst. 77.5 per cent of the polymerization product boil between 50° and 200° C., the remainder boiling up to 290° C. Without the addition of metal but under otherwise identical conditions, the maximum daily yield is 800 grams per liter of catalyst; moreover the activity of the catalyst subsides rapidly. By adding 2 grams of copper sulphate without reduction, about 960 grams are obtained per day, the copper sulphate dissolving within a short time in the phosphoric acid.

Example 2

200 cubic centimeters of 10 per cent copper formate solution are poured over 100 cubic centimeters of active carbon in vacuo. After 12 hours, the whole is filtered, the residue is dried at 110°

C. and the product reduced for a short time in a current of hydrogen in a tube heated to about 300° C. After dropping in 29 grams of 89 per cent phosphoric acid into the resulting mass while carefully excluding air and while shaking, the mass is charged into a reaction tube, also while excluding air.

Into the said tube there are then led 3 liters of propylene per hour at 200° C. The yield of polymerization product during 12 days amounts to from 96 to 101 grams per day which, with reference to a liter of catalyst, corresponds to a daily yield of from 960 to 1010 grams. 81 per cent of the polymerization product boil between 90° and 200° C., the remainder boiling up to 290° C. A catalyst of 100 cubic centimeters of the same active carbon, 29 grams of 89 per cent phosphoric acid and an addition of 2 grams of copper sulphate gives a maximum yield of 96 grams of polymeric hydrocarbons on the first day but this yield falls rapidly to 68 grams at the 11th day.

Example 3

100 cubic centimeters of active carbon are impregnated by dropping therein a solution of 5.4 grams of copper chloride in 20 cubic centimeters of water and then treated in a quartz tube in a current of hydrogen to reduce the copper chloride. 29 grams of 89 per cent phosphoric acid are introduced into the resulting copperized carbon. By leading 3 liters of propylene per hour thereover at 200° C. there is obtained at first a daily yield of 88 grams of polymerization product which has fallen to 72 grams after 18 days. 90 per cent of the polymerization product boil between 120° and 250° C., the remainder boiling up to 320° C.

What I claim is:

1. A process for the catalytic polymerization of low-molecular olefins to produce liquid hydrocarbons which comprises contacting the said olefins at a reaction temperature with a catalyst comprising an acid of phosphorus in admixture with a free metal which is less electro-positive than hydrogen and which is in a finely divided form.

2. In the process as claimed in claim 1 the step of applying the acid of phosphorus to a carrier onto which a metal less electro-positive than hydrogen has been precipitated in fine dispersion.

3. In the process as claimed in claim 1 contacting the olefin with a catalyst containing phosphoric acid and finely divided copper.

HEINZ INDEST.